United States Patent [19]
Thornton, Jr.

[11] Patent Number: 5,195,859
[45] Date of Patent: Mar. 23, 1993

[54] FASTENER FOR JOINING A PLURALITY OF LAYERS

[75] Inventor: Harold C. Thornton, Jr., Anderson County, Tenn.

[73] Assignee: The GlasScrew Company, Oak Ridge, Tenn.

[21] Appl. No.: 783,505

[22] Filed: Oct. 28, 1991

Related U.S. Application Data

[63] Continuation-in-part of Ser. No. 569,612, Aug. 20, 1990, abandoned.

[51] Int. Cl.⁵ ............................................. F16B 19/00
[52] U.S. Cl. .................................... 411/510; 411/913; 16/228
[58] Field of Search ............... 411/510, 508, 509, 913, 411/908, 909, 907, 392; 52/410, 512; 24/297, 453, 662; 403/157; 16/228, 380, DIG. 13, 386

[56] References Cited

U.S. PATENT DOCUMENTS

| | | |
|---|---|---|
| 1,974,160 | 9/1934 | Peirson . |
| 2,947,024 | 8/1960 | Czudak, Jr. . |
| 2,991,695 | 7/1961 | Jones . |
| 3,349,430 | 10/1967 | Rosenvold et al. ............. 16/228 X |
| 3,546,735 | 12/1970 | Liautaud . |
| 3,826,565 | 7/1974 | Wenzel . |
| 4,345,848 | 8/1982 | Cheselka . |
| 4,381,633 | 5/1983 | MacLeod ........................ 411/508 X |
| 4,427,328 | 1/1984 | Kojima . |
| 4,776,739 | 10/1988 | Hamman ............................ 411/510 |
| 4,900,210 | 2/1990 | Buchanan et al. ............. 411/510 X |
| 4,902,182 | 2/1990 | Lewis ................................ 411/510 |

FOREIGN PATENT DOCUMENTS

| | | | |
|---|---|---|---|
| 64768 | 11/1982 | European Pat. Off. ............ 411/510 |
| 2711335 | 9/1978 | Fed. Rep. of Germany ........ 52/410 |
| 2589204 | 4/1987 | France ................................. 411/37 |
| 259901 | 9/1988 | German Democratic Rep. ..................................... 411/510 |
| 7139 | 9/1988 | PCT Int'l Appl. ................. 411/510 |
| 344549 | 3/1960 | Switzerland ........................ 411/510 |
| 520169 | 4/1940 | United Kingdom ................ 411/510 |

Primary Examiner—Rodney M. Lindsey
Attorney, Agent, or Firm—Pitts & Brittian

[57] ABSTRACT

An easily insertable fastener for use joining a plurality of layers of material, and particularly as the pin for an eyeglass temple hinge. This fastener has a shank member to pass through apertures of the layers and extend outward from a far side. A plurality of sets of fingers extend from the shank member along the length thereof, with a recess provided immediately adjacent each set of fingers whereby the fingers, when distorted, are fully received in the recess as the fastener is inserted. The recess depth corresponds to the thickness of the adjacent fingers. When the fastener is fully in place, at least one of the sets of fingers projects from the opposite side of the layers such that the projecting set of fingers returns to the extended position to prevent removal of the fastener. Several embodiments are shown and described for use as eyeglass temple hings fasteners where all of the apertures of the hinge barrels are of the same size, as well as when an outer barrel is smaller and/or is threaded. One embodiment has several fasteners of different size attached axially so that a fastener of a desired size is automatically chosen. Any of the embodiments can have an extension at the leading end to facilitate pulling the fastener through the apertures.

22 Claims, 3 Drawing Sheets

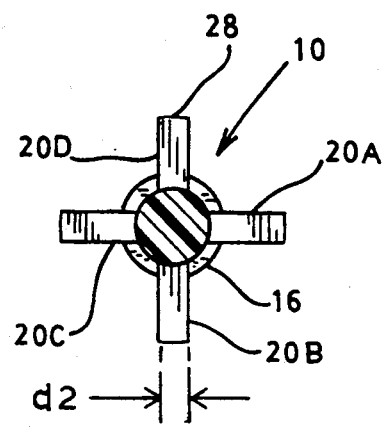
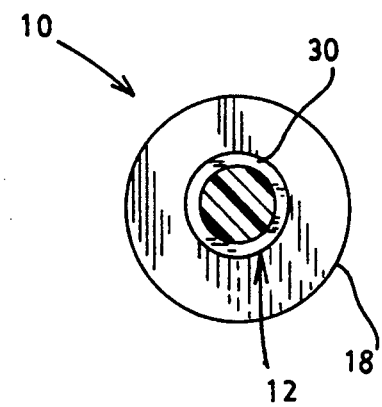
FIG. 4  FIG. 5
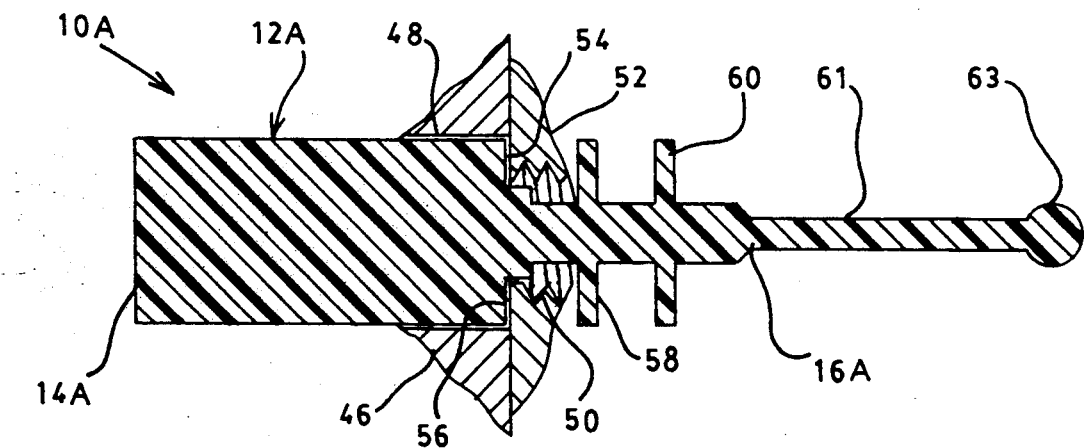
FIG. 6

FASTENER FOR JOINING A PLURALITY OF LAYERS

This is a Continuation-in-Part application based upon U.S. parent application Ser. No. 07/569,612 filed Aug. 20, 1990, now abandoned.

TECHNICAL FIELD

The present invention relates generally to fasteners for joining a plurality of layers, and more particularly to a fastener for use as a hinge pin in such applications as the hinge of eyeglasses.

BACKGROUND ART

In the hinge art the nomenclature for components varies slightly depending upon the type of hinge that is being described. For the bulk of hinges, typically there are at least two "leaves" that are joined to "knuckles" through which passes the "hinge pin" such that the leaves can be pivoted with respect to each other about the hinge pin axis. However, the hinge that is used for eyeglasses and the like uses the terminology "barrels" for the overlapping portions having aligned apertures to accept the hinge pin. Typically these hinges of the eyeglass art have an odd number of barrels, as 3, 5, 7 and 9. As such, the top and bottom barrels (and perhaps the odd ones in between) are joined to one member and the remaining barrels are joined to the other member for which pivotal motion is desired. Another distinction between these types of hinges is that the conventional hinge normally has a constant diameter of the aperture in the knuckles, while the eye glass hinge can either have a uniform size aperture in all barrels or the top or bottom barrel can be of smaller diameter, with this portion being threaded to threadably receive a threaded portion of the hinge pin. Although the present invention can be adapted to hinge pins of the common hinge, or to any joining of a plurality of layers, it is deemed to have particular application for use as the hinge pin for eyeglasses either as a temporary substitute for original pins or as an original pin.

It is a common problem with wearers of eyeglasses to lose a temple hinge pin at the most inopportune time. Seldom does a person have a replacement handy or even have a screw driver to reset the pin. More often the pin falls where it cannot be retrieved. Temporary repair usually entails inserting a tooth pick end or such other device that is fitted through at least a portion of the barrels.

Various other temporary or permanent solutions to the problem have been addressed by persons of the prior art. For example, in U.S. Pat. No. 2,947,024 ('024) issued to F. Czudak, Jr. on Aug. 2, 1960, a stud-type pin is provided that can be inserted through the barrels, with the pin having an axial slot such that outwardly extending protrusions can move toward each other during the insertion of the pin through the hinge and yet permit the protrusions to move outwardly when in place to catch against the bottom of the barrels. In one embodiment a spring is inserted into the slot to ensure the outward movement of the protrusions. This device is sized to fit a particular diameter of the aperture in the barrels as well as the total thickness of all of the barrels of the hinge.

Another prior solution to the problem is described in U.S. Pat. No. 2,991,695 ('695) issued to H. V. Jones on Jul. 11, 1961. This pin is a self-locking screw that initially has a length greater than the combined dimension of the barrels. The shank has an axial slot that terminates before the distal end of the screw such that when excess length of the screw is cut away, the portions of the screw on either side of the slot become legs that tend to diverge from each other due to stresses that are instilled therein during manufacture. This device is sized to fit a particular diameter of aperture in the barrels: there is no limitation on the length as long as the slot extends beyond the bottom barrel of the hinge.

U.S. Pat. No. 3,546,735 ('735) issued to P. J. Liautaud on Dec. 15, 1970, describes a resilient hinge pin that is useful when the bottom barrel is threaded. It has a shank that closely fits the aperture of the other barrels, and has a distal end that can be forced through the threaded portion which then expands upon exiting the threaded portion. This device is sized both for the diameter of the apertures as well as for the total thickness of the hinge. Another spectacle hinge pin is described in U.S. Pat. No. 3,826,565 ('565) issued to R. A. Wenzel on Jul. 30, 1974. This pin has a head with a depending shank with a portion of the shank having a diameter matching that of the apertures of the barrels and a distal portion of reduced diameter. Extending from this portion of reduced diameter is a barb that, when it exits from the lower barrel, engages the bottom surface of that barrel to inhibit the accidental removal of the pin. The pin is illustrated as being used for a hinge having a threaded lower barrel. This construction requires sizing as to the diameter of the apertures, as well as the distance from the head to the barb for a given thickness of hinge.

Several embodiments of a hinge pin are described in U.S. Pat. No. 4,345,848 ('848) issued to S. Cheselka on Aug. 24, 1982. In one embodiment, there is a head with a depending shank that passes through the apertures to extend beyond the bottom of the barrels. This shank is serrated on the surface, and a cap is frictionally engagable with the serrations to hold the pin in position. Another embodiment of that patent depicts a pin of a length generally corresponding to the total thickness of the hinge which has outwardly extending flaps that engage the bottom surface of the bottom barrel, with these flaps being received in recesses in the shank while the pin is forced through the barrels. This embodiment must be sized for the diameter of the apertures, as well as to the total thickness of the hinge. Further, this pin is not adaptable to hinges wherein the lower (or upper) barrel aperture is threaded.

As indicated above, there is great variation in the thickness of the hinge. This is due to the number of barrels and the thickness of each barrel. In addition, there is a great variation in the "standard" diameters of the apertures of the barrels as well as the threaded aperture of some barrels. The typical "standard" diameters are approximately 0.040, 0.050 and 0.060 in. Also, as indicated above, the pins of the prior art must be sized for the aperture size, and some must be sized for the thickness of the hinge. These two size limitations require that there be a significant number of different sizes of pins and thread configurations (probably of the order of 200) such that all eyeglasses can be accommodated.

Other references that may be pertinent to an evaluation of the present invention are U.S. Pat. No. 1,974,160 issued to C. R. Peirson on Sep. 18, 1934; No. 4,381,633 issued to R. J. MacLeod on May 3, 1983; No. 4,427,328 issued to M. Kojima on Jan. 24 1984; No. 4,776,739 issued to D. C. Hamman on Oct. 11, 1988; and No. 4,902,182 issued to J. C. Lewis on Feb. 20, 1990. Possibly pertinent foreign patents are British Patent 520,169 and German Patent 2,711,335.

The U.S. Pat. No. '633 patent describes a fastener for use in attaching a structural element (e.g., shutters) to a surface (e.g., an exterior wall). There is a shank with curved flexible hemi-annular projections that can be deformed toward the shank as the fastener is passed into apertures in the items to be fastened. Due to the shape of the projections, which curl inwardly as deformed, transverse motion of the joined components can occur since there is no intent to prevent such movement. The shape of the projections prevents their coming into full contact with the shank.

The British patent ('169) is directed to a plug to fill a hole, and is not directed to joining any layers. The plub has various forms of "ribs" that engage the inner surface of the hole. These ribs have either a saw-tooth cross-section (preferred), or can have a rounded shape. In the preferred form, there is a recess adjacent each rib that is slightly smaller than the rib.

In the German patent ('335), which is directed to a device for attaching insulating board, there is a dowel-type threaded socket to which is fitted a number of barbed hooks. These hooks are caused to become imbedded in the insulating panel.

Accordingly, it is an object of the present invention to provide a fastener for joining a plurality of layers of material where the layers can be the same or different materials, with those layers having aligned apertures to closely receive the fastener, the fastener preventing transverse movement of the layers.

A further object of the present invention is to provide a hinge pin for use in eyeglasses that reduces the number of configurations that are required to provide a pin for the large combination of hinge thicknesses and apertures.

It is another object of the present invention to provide a hinge pin for use in eyeglasses that can be utilized for any standard diameter of aperture and any standard hinge thickness.

Another object of the present invention is to provide a hinge pin for use in eyeglasses, either as a replacement or as an original pin, that can be used for either a hinge having a threaded barrel or a hinge with an unthreaded barrel.

A further object of the present invention is to provide a hinge pin for use in eyeglasses, or for the joining of multiple layers of material, that is easily inserted in apertures of the parts.

These and other objects of the present invention will become apparent upon a consideration of the drawings identified below together with a complete description thereof.

DISCLOSURE OF THE INVENTION

In accordance with the present invention, there is provided a fastener for joining a plurality of layers of material (from flexible to rigid) with a top layer defining a top surface and a bottom layer defining a bottom surface, with all of the layers provided with aligned apertures of a given cross-sectional configuration. This pin has a shank portion with a first end and a distal end for being received within the apertures, with a plurality of fingers extending radially therefrom at selected positions along its length, with the distal ends of the fingers extending a distance greater than the diameter of the shank. The fingers have a uniform thickness, in a direction parallel to the axis of the shank portion, along their length. The shank portion is provided with recesses along its length adjacent each finger, of a depth substantially equal to the finger thickenss, such that as the fastener is passed through the apertures the fingers are fully received within the recesses. In this position, the fingers within the recesses completely fill the apertures to prevent any transverse movement. At least a portion of the fingers again extend outwardly when that portion of the shank exits from the aperture of the lower layer of material to 10 generally prevent removing the fastener from the apertures. The shank can have a head at the first end; however, when the lower layer has an aperture of reduced diameter, the shank can be provided with a shoulder between a portion of larger diameter and the portion of reduced diameter to thereby eliminate the need for the head. In one embodiment several pins are fabricated as an axial array, with each having a different diameter. whereby a pin of a selected diameter is automatically selected for a particular application. The present invention is specifically illustrated as a pin for use in the temple hinges of eyeglasses and like structures.

BRIEF DESCRIPTION OF THE DRAWINGS

FIG. 4 is a transverse cross-sectional drawing of the fastener of FIG. 1 taken at 4—4 thereof illustrating one embodiment of the radially-extending fingers.

FIG. 5 is a transverse cross-sectional drawing of the fastener of FIG. 1 taken at 5—5 thereof illustrating the recess for receiving the fingers of FIG. 4 as the fastener is inserted through the layers as illustrated in, FIG. 2.

FIG. 6 is a cross-sectional view of another embodiment of the present invention.

BEST MODE FOR CARRYING OUT THE INVENTION

Figure 1:
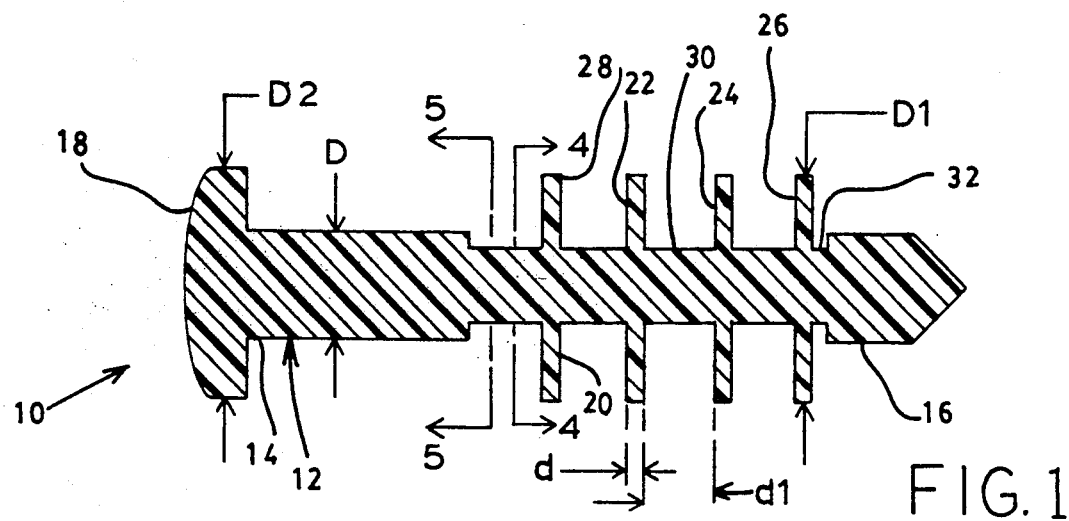
FIG. 1 is a longitudinal cross-sectional drawing of one embodiment of a fastener of the present invention.
Figure 2:
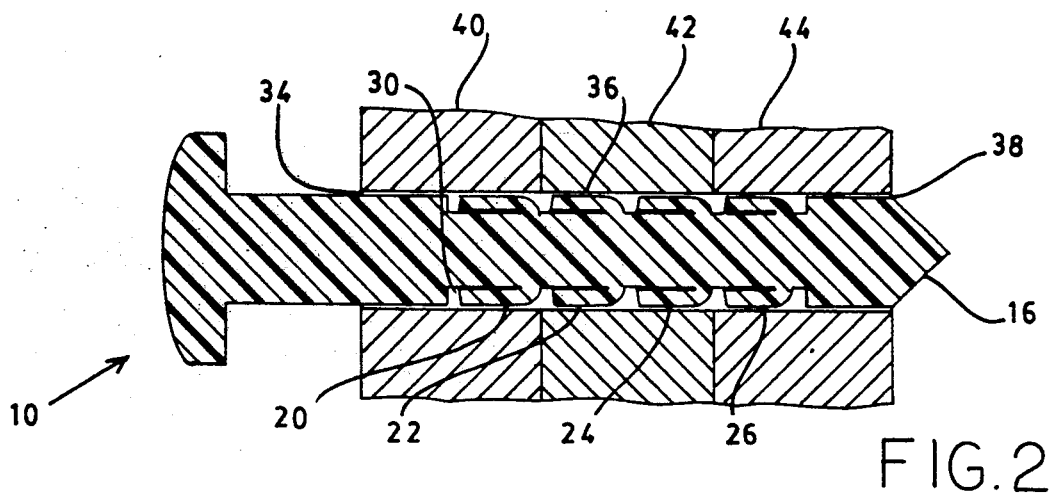
FIG. 2 is a fragmentary longitudinal cross-sectional drawing of the embodiment of FIG. 1 as it is passed through a plurality of layers of rigid material, such as the temple hinge barrels of eyeglasses.
Figure 3:
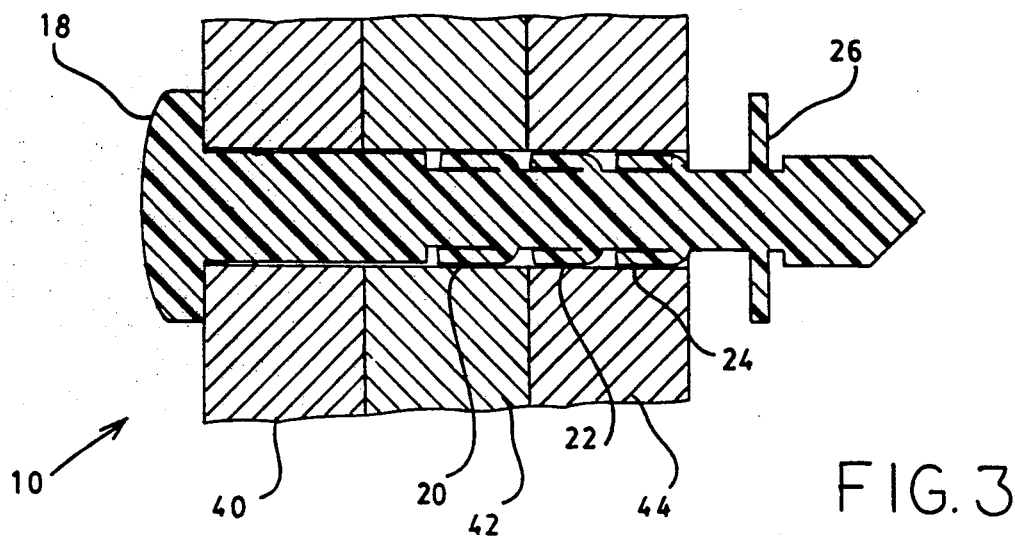
FIG. 3 is a fragmentary longitudinal cross sectional drawing of the embodiment of FIG. 1 as it is fully inserted through the plurality of layers illustrating the locking feature of the fastener. In both this figure and in FIG. 2 it can be seen that fingers of the fastener serve as shims and the apertures are completely filled to prevent transverse movement of the layers.

The most general form of the present invention can be understood by reference to FIGS. 1 through 5. In these, and the other drawings, components are generally enlarged so as to better illustrate the present invention. The fastener of this embodiment is indicated generally at 10 in these figures. Referring specifically to the cross section in FIG. 1, the fastener has a shank 12 with a first end 14 and a distal end 16. The shank 12 has a thickness, D, to be closely received in apertures in the layers to be joined. A head portion 18 is affixed at the first end 14. This head can, if desired, be decorative or have a decorative item attached thereto. Projecting generally radially from the shank 12 are a plurality of sets of fingers 20, 22, 24, 26 (see also FIG. 4) each having a uniform thickness, d, arranged along the shank 12 with these fingers being formed integrally with the shank. While four sets of fingers are illustrated in FIGS. 1-3, any number of a plurality of such fingers can be used. The finger distal ends (as at 28 of finger 20) project outwardly a selected distance, D1, from the outer surface of the shank (usually a distance corresponding to greater than the width, D, of the shank for purposes described hereinafter. Adjacent each of the fingers is provided a recess (as at 30) of a depth substantially equal to the thickness, d, of the fingers to completely receive an adjacent finger (i.e., finger 24) when such is depressed toward the shank when the fastener is inserted into hinge apertures (see FIGS. 2 and 3). Accordingly, the fingers 20, 22, etc. are spaced apart (typically uniformly) a distance, d1, such that each can be received in a corresponding recess 30. The distal end 16 of the shank 12 preferably is the same size as the shank (i.e., D) such that this distal end serves as a "go-no-go" gage to determine if the fastener is of the proper size for a given aperture to receive the same. A recess 32 precedes this distal end portion 16 so as to permit sufficient deformation of the finger closest thereto (i.e., finger 26).

As can be seen by subsequent FIGS. 4 and 5, the preferred fastener (for use in hinges) has a circular cross section. Thus, the recesses 30 and 32 can be annular grooves in the shank. This substantially facilitates fabrication of the fastener by known methods as described hereinafter. However, the fastener can have other cross sections (e.g., oval, square, etc.) and the recesses can have other configurations as long as the recesses 30 fully receive the fingers when deformed during insertion of the fastener into apertures in the layers to be joined.

Illustrated in FIG. 2 is the fastener 10 of FIG. 1 when partially inserted through apertures 34, 36 and 38 of three layers of material 40, 42 and 44. While three layers are illustrated, any number of layers can be used as long as the total can be penetrated by the fastener 10. During this insertion all of the plurality of fingers 20, 22, 24 and 26 are deformed so as to be completely received within their corresponding recesses 30. Then in FIG. 3, the fastener 10 is shown with the head 18 in contact with outer layer 40. The length of the fastener 10 is selected such that in this position, at least one of the sets of fingers (i.e., 26) extend sufficiently from layer 44 such that the inherent "memory" of the material of the fingers causes causes the fingers to again extend radially. In this position the fastener cannot be readily removed from the layers of material. It can be seen that any undistended fingers (e.g., 20, 22 and 24) form shims sufficiently filling the apertures of the layers 42 and 44 such that the fastener 10 fits snugly within these apertures to limit any relative transverse movement thereof. Of course, all of the fingers will return to their substantially radial orientation if the total thickness of the various layers is less than that shown in this FIG. 3. Thus, the fastener does not have to be of a given length to fasten the layers.

Cross sections of the fastener embodiment of FIG. 1 are shown in FIGS. 4 and 5, taken at 4—4 and 5—5 therein, respectively. In this embodiment it can be seen from FIG. 4 that finger 20 is, in reality, four fingers 20A, 20B, 20c and 20D that extend radially from the shank, with the transverse width (perpendicular to the shaft axis), d2, of each being sufficiently small such that the finger can be easily deformed into the adjacent recess 30 (of FIG. 5). With this limitation on transverse width, any number of finger elements can be used in each set of fingers, from one to several with the maximum being that number that can fully fit within the recess 30. Typically one, two or four elements in each set provide for convenient formation by the methods of manufacture of the present fasteners.

There are applications for the present invention wherein the final layer to be penetrated by the fastener has an aperture of smaller size than the other layer or layers to be joined. This typically is the case when the outer barrel of an eyeglass temple hinge is threaded. Such is illustrated at 10A in FIG. 6 where one layer 46 has an aperture 48 of larger size than threaded aperture 50 in layer 52. This change in size defines an offset indicated at 54. In this application, the shank 12A is provided with a shoulder at 56 that mates with the offset 54. Then when at least one of the fingers 58, 60 regains its radial orientation after passage through layer 52, the fastener cannot be removed. Since the shoulder 56 prevents further passage of the fastener through the last barrel, and since this barrel is physically connected to the top barrel of the hinge, there is no need for a head to be provided on the shank. If there is no such connection between the layers being joined, however, a head will be required. Although fingers and recesses are shown on only the shank portion of smaller diameter, such fingers and recesses can be positioned along portions of both sizes.

Also shown in this FIG. 6 is a feature that can be adapted for all of the embodiments of the present invention. This feature is an elongated extension 61 from the distal end 16A. This extension can terminate in an enlarged portion 63 which is no larger in size than the apertures through which the fastener is to be passed. The purpose of this extension (and enlarged portion) is to provide means for pulling the fastener through apertures of the hinge barrels, etc. Because of the very small sizes of the fasteners for eyeglass hinges, insertion by pushing may be difficult.

As indicated above, in the specific field of temple hinge pins, there are several ranges of "standard" sizes: approximately 0.040, 0.050 and 0.060 in. If replacement pins (fasteners) are desired for all of the sizes, a large number must be included in a "replacement kit". This can be solved by the embodiment of the present invention illustrated at 10B in FIG. 7. This embodiment is actually several axially-aligned fasteners designated 64, 66 and 68 therein of a type similar to that of FIGS. 1-6. For example, unit 64 can have a shaft 70 with a diameter to fit the 0.060 in. pin size, unit 66 can have a shaft 72 to fit the 0.050 in. size, and unit 68 can have a shaft 74 to fit the 0.040 in. size. As stated above, these are approximate sizes found in typical eyeglass hinges. A head 76 of unit 68 becomes a distal go-no-go gauge for unit 66, and a head 78 of unit 66 becomes a go-no-go gauge for unit 64. Unit 64 has a head 80, and unit 68 has a go-no-go gauge distal end 82. The units each have a plurality of radially extending fingers (like in FIG. 4) at 84, 86 and 88. The length of each of the fastener units is selected to accommodate the largest number of conventional hinge barrels, and the number of fingers for each is selected so that at least one finger will extend radially after passage through the barrels. This is illustrated for unit 66 in relationship to the three barrels 90, 92 and 94. Of course, if there are other numbers of "standard" apertures that must be fit, a sufficient number of units (two or more)of those dimensions can be arranged axially in a similar manner.

Figure 7:
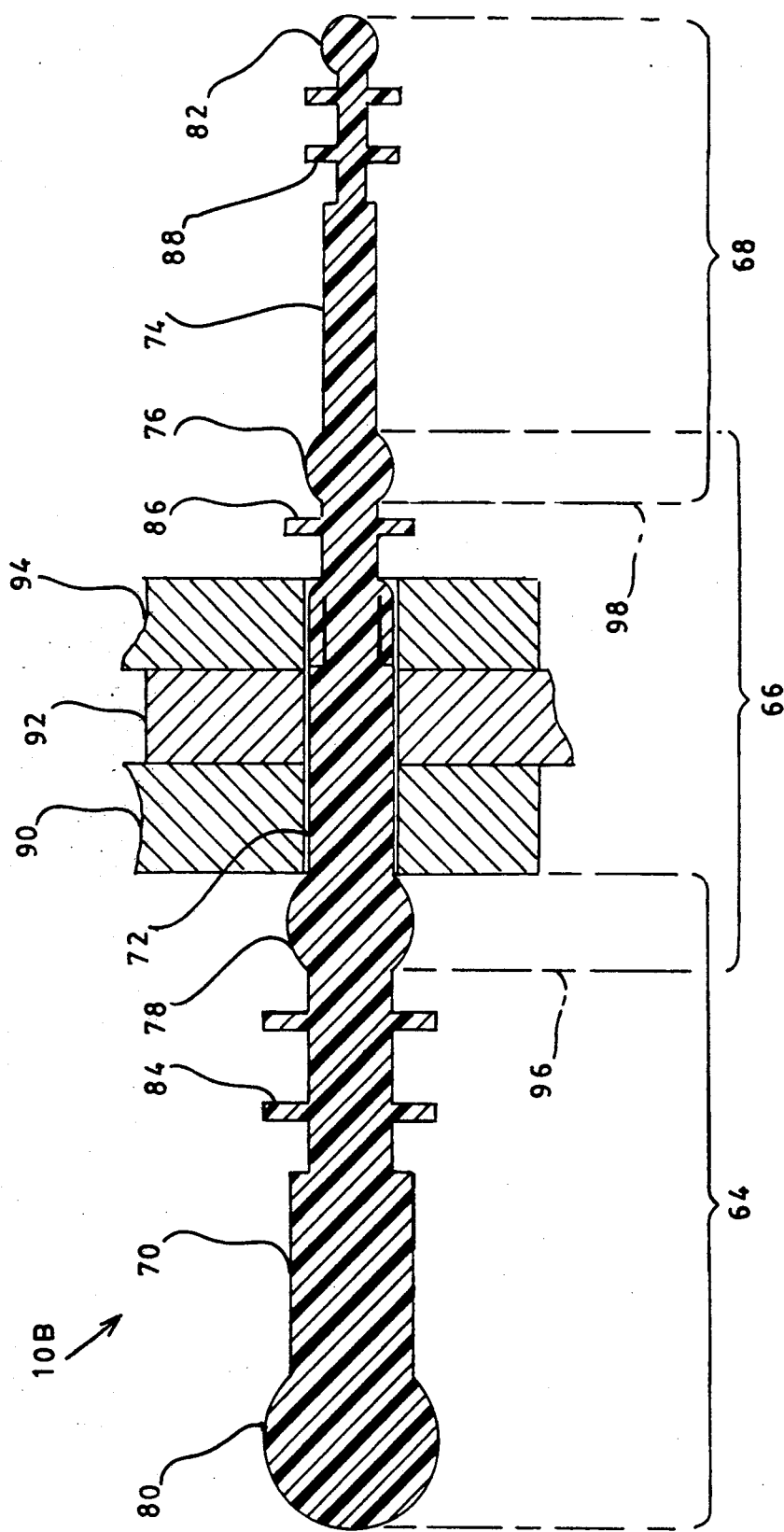
FIG. 7 is a cross-sectional view of a further embodiment of the present invention depicting a fastener having segments of different diameters so that a fastener of a selected diameter is automatically chosen for an application wherein the layers have apertures of that selected size as the fastener is inserted into the apertures.

With an embodiment of the type shown in FIG. 7, the multiple unit is inserted into the apertures of the layers to be joined. It is advanced into these apertures until a head of one of the units fails to continue through the top layer. Since in this position, at least one of the fingers of this unit will have been redeployed to its substantially radial orientation, the excess of the combined unit above the head and before the head of the smaller unit can be clipped off or otherwise removed so that only the one unit remains to retain the fastening of the layers. These removal points are indicated at 96 and 98 in FIG. 7.

From the foregoing it will be understood that an improved fastener has been developed for the joining of multiple layers of materials. These fasteners may, for example, permit the manufacture of non-metallic temple hinges and thus reduce the cost of eyeglass frames. Of particular importance, this fastener can be used as the pin in the temple hinge of eyeglasses. As such, it can be used as a replacement when the original pin (or screw) has been lost, or as an inexpensive original pin for such hinges. The same principle is applicable to fasteners to be used when the apertures of the layers differ in size. While the cross section is made to closely approximate the aperture within the layers, there is no close restriction on the length of the fasteners of the present invention as long as at least one of the sets of fingers (of a plurality of axially positioned finger sets) exits the last layer to be penetrated such that the fingers return to their substantially radial orientation to prevent withdrawal of the fastener from the apertures.

The fasteners, particularly when used for eyeglasses, are typically fabricated from a tough elastomer, such as Nylon. They can be formed using injection molding, heated rotary dies or by other methods well known in the art. For this reason, it may be desirable to use the number of fingers in each finger set as specified above.

Although certain embodiments of the present invention have been shown and described, these are not for the limitation of the invention. Rather, the invention is to be limited only by the appended claims or their equivalents when read in conjunction with the complete disclosure of the invention.

I claim:

1. A fastener for joining a plurality of layers of materials including a top layer defining an exposed surface and a bottom layer defining a second exposed surface, said layers provided with aligned apertures of a selected cross-sectional configuration, said fastener comprising:

a shank member having a first end portion and a distal end portion, with an axial length portion between said first and distal end portions having a cross section to be closely received in said aligned apertures;

means associated with said shank member to limit passage of said shank member through said aligned apertures whereby said distal end portion extends from said second exposed surface of said bottom layer when said fastener is fully inserted into said aligned apertures;

a plurality of sets of fingers positioned at selected axial locations along said shank member between said first end portion and said distal end portion, said sets of fingers being integral with said shank member and extending substantially radially outward from said shank member, fingers of each of said set of fingers having a substantially uniform thickness along their length, said thickness being in a direction parallel to an axis of said shank member; and wherein said shank member is provided with a recess immediately adjacent each set of said fingers in a direction toward said first end, said recess having a depth substantially equal to said thickness of said fingers so as to fully receive said adjacent set of fingers as said fingers are displaced toward said shank member as said shank member is passed through said apertures whereby fingers displaced into said recesses fill said aligned apertures to prevent relative transverse movement of said plurality of layers with respect to each other.

2. The fastener of claim 1 wherein said plurality of sets of fingers are spaced substantially equally along said shank member between said first end portion and said distal end portion.

3. The fastener of claim 1 wherein said means to limit passage of said shank member through said aligned apertures is a head member at said first end of said shank member whereby said head member bears against said exposed surface of said top layer when said fastener is fully inserted into said apertures.

4. The fastener of claim 1 wherein said fingers extend from said shank member to a distance greater than a transverse dimension of said shank member.

5. The fastener of claim 1 wherein each of said sets of fingers has at least one finger extending substantially radially from said shank member at each said selected axial location along said shank member.

6. The fastener of claim 1 wherein said cross section of said shank member is circular and said recess adjacent each said sets of fingers is an annular recess around said shank member.

7. The fastener of claim 1 wherein said shank member defines a first uniform cross-sectional size near said first end portion and a second and smaller uniform cross-sectional size near said distal end portion, and said sets of fingers and recesses to receive said fingers are positioned at locations along said shank member at each of said cross-sectional sizes whereby said fastener can be inserted through said aligned apertures and one of said cross-sectional sizes of said shank member is closely received in said apertures.

8. The fastener of claim 1 wherein said shank member defines a first uniform cross-sectional portion near said first end portion, a second and smaller uniform cross-sectional portion near said distal end portion so as to define a shoulder between said first cross-sectional portion and said smaller cross-sectional portion, said shoulder being said means to limit passage of said shank member through said aligned apertures, and said sets of fingers and said recesses to receive said fingers are positioned at locations along at least said smaller uniform cross-sectional portion.

9. The fastener of claim 1 wherein said distal end portion of said shank member is a go-no-go gage for determining access to said apertures of said layers to be joined.

10. The fastener of claim 1 wherein said distal end portion of said shank member is provided with an axial extension, said axial extension for facilitating the pulling of said fastener through said apertures in said plurality of layers of materials by a user of said fastener.

11. The fastener of claim 1 wherein said shank member defines a first uniform cross-sectional size near said first end portion, a second and smaller uniform cross-sectional size near said distal end portion and at least one intermediate uniform cross-sectional size intermediate said first end portion and said distal end portion, and said sets of fingers and recesses to receive said fingers are positioned at locations along said shank member at each of said cross-sectional sizes whereby said fastener can be inserted through said aligned apertures and one of said cross-sectional sizes of said shank member is closely received in said apertures.

12. A fastener for joining the barrels of an eyeglass temple hinge, said hinge including a top barrel defining an exposed surface and a bottom barrel defining a second exposed surface, said barrels provided with aligned apertures of a selected circular cross-sectional size, said fastener comprising:
- a shank member having a first end portion and a distal end portion, with an axial length portion between said first and distal end portions having a circular cross section to be closely received in said aligned apertures of said barrels;
- means associated with said shank member to limit passage of said shank member through said aligned apertures whereby said distal end portion extends from said second exposed surface of said bottom barrel when said fastener is fully inserted into said aligned apertures;
- a plurality of sets of fingers positioned selected axial locations along said shank member between said first end portion and said distal end portion, said sets of fingers being integral with said shank member and extending substantially radially outward from said shank member, each of said sets of fingers having fingers of a substantially uniform thickness along their length, said thickness being in a direction parallel to an axis of said shank member; and
- wherein said shank member is provided with a recess immediately adjacent each of said sets of fingers in a direction toward said first end, said recess having a depth substantially equal to said thickness of said fingers to fully receive said adjacent set of fingers as said fingers are displaced toward said shank member as said shank member is passed through said apertures whereby fingers displaced into said recesses fill said aligned apertures to prevent transverse movement of said barrels with respect to each other.

13. The fastener of claim 12 wherein said means to limit passage of said shank member through said aligned apertures is a head member at said first end of said shank member whereby said head member bears against said exposed surface of said top barrel when said fastener is fully inserted into said apertures.

14. The fastener of claim 12 wherein said shank member defines a first uniform cross-sectional size near said first end portion and a second and smaller uniform cross-sectional size near said distal end portion, and said sets of fingers and recesses to receive said fingers are positioned at locations along said shank member at each of said cross-sectional sizes whereby said fastener can be inserted through said aligned apertures and one of said cross-sectional sizes of said shank member is closely received in said apertures.

15. The fastener of claim 12 wherein said shank member defines a first uniform cross-sectional size near said first end portion, a second and smaller uniform cross-sectional size near said distal end portion to define a shoulder, said shoulder being said means to limit passage of said shank member through said aligned apertures, and said sets of fingers and said recesses to receive said fingers are positioned at locations along said portion of smaller cross-sectional size.

16. The fastener of claim 12 wherein each said sets of fingers has at least one finger extending substantially radially from said shank member at each said selected location along said shank member.

17. The fastener of claim 12 wherein said fingers extend from said shank member to a distance greater than a transverse dimension of said shank member.

18. The fastener of claim 12 wherein said distal end portion of said shank member is provided with an axial extension, said axial extension for facilitating the pulling of said fastener through said apertures in said plurality of layers of materials by a user of said fastener.

19. The fastener of claim 12 wherein said shank member defines a first uniform cross-sectional size near said first end portion, a second and smaller uniform cross-sectional size near said distal end portion and at least one intermediate cross-sectional size intermediate said first end portion and said distal end portion, and said sets of fingers and said recesses to receive said sets of fingers are positioned at locations along said shank member at each of said cross-sectional sizes whereby said fastener can be inserted through said aligned apertures and one of said cross-sectional sizes of said shank member is closely received in said apertures.

20. The fastener of claim 12 wherein said plurality of sets of fingers are spaced substantially equally along said shank member between said first end portion and said distal end portion.

21. A fastener for joining the barrels of an eyeglass temple hinge, said hinge including a top barrel defining an exposed surface and a bottom barrel defining a second exposed surface, said barrels provided with aligned apertures of a selected circular cross-sectional size, said fastener comprising: a shank member having a first end portion and a distal end portion, with an axial length portion between said first and distal end portions, said shank member defining a first uniform cross sectional size near said first end portion, a second and smaller uniform cross sectional size near said distal end portion and an intermediate cross sectional size intermediate said first end portion and said distal end portion, each of said cross sectional sizes being closely received in a corresponding size of apertures of said barrels;
- means associated with said shank member limit passage of said shank portion through said aligned apertures whereby said distal end portion extends from said second exposed surface of said bottom barrel when said fastener is fully inserted into said aligned apertures;
- a plurality of sets of fingers positioned at substantially uniform locations along said shank member in each of said cross sectional sizes between said first end portion and said distal end portion, said fingers being integral with said shank member and extending substantially radially outward from said shank member, fingers of each of said sets of fingers having a substantially uniform thickness along their length, said thickness being in a direction parallel to an axis of said shank member; and
- wherein said shank member is provided with a recess immediately adjacent each of said sets of fingers in a direction toward said first end, said recess having a depth substantially equal to said thickenss of said fingers to fully receive said adjacent set of fingers as said fingers are displaced toward said shank member as said shank member is passed through said apertures to prevent relative movements of said barrels with respect to each other transverse to said aligned apertures.

22. The fastener of claim 21 wherein said distal end portion of said shank member is provided with an axial extension, said axial extension for facilitating the pulling of said fastener through said apertures in said plurality of hinge barrels by a user of said fastener.

* * * * *